US00RE46343E

(19) United States
(12) Reissued Patent
Des Champs

(10) Patent Number: US RE46,343 E
(45) Date of Reissued Patent: Mar. 21, 2017

(54) INDIRECT EVAPORATIVE COOLING HEAT EXCHANGER

(75) Inventor: Nicholas H. Des Champs, Las Vegas, NV (US)

(73) Assignee: THE MUNTERS CORPORATION, Amesbury, MA (US)

(21) Appl. No.: 13/506,713

(22) Filed: May 11, 2012

Related U.S. Patent Documents

Reissue of:
(64) Patent No.: 7,716,829
Issued: May 18, 2010
Appl. No.: 11/366,749
Filed: Mar. 3, 2006

U.S. Applications:
(63) Continuation of application No. 10/853,160, filed on May 26, 2004, now Pat. No. 7,128,138.

(51) Int. Cl.
*B21D 39/08* (2006.01)
*B21D 53/02* (2006.01)
(Continued)

(52) U.S. Cl.
CPC ..... *B23P 15/26* (2013.01); *F28F 1/40* (2013.01); *F28F 9/14* (2013.01); *F28F 9/162* (2013.01); *F28F 21/062* (2013.01); *F24F 2001/0092* (2013.01); *Y02B 30/545* (2013.01); *Y10T 29/4935* (2015.01); *Y10T 29/4938* (2015.01); *Y10T 29/49359* (2015.01);
(Continued)

(58) Field of Classification Search
CPC ..... B21D 53/085; B21D 39/203; F24H 8/00; B23P 15/26; F28F 1/40; F28F 9/14; F28F 9/162; F28F 21/062; Y01T 29/49377; Y01T 29/49359; Y01T 29/49378; Y01T 29/49364; Y01T 29/4935; Y01T 29/4938; F24F 2001/0092
USPC ..... 29/890.044, 890.047, 890.03, 890.035, 29/890.038, 890.043, 890.045, 890.046; 122/18.2; 165/46, 229, 84; 277/596; 261/112.1, 153
See application file for complete search history.

(56) References Cited

U.S. PATENT DOCUMENTS 2,151,540 A 3/1939 Varga
3,398,040 A 8/1968 Allen
(Continued)

OTHER PUBLICATIONS

Aztec Cooling, Jun. 21, 2006, [online], [retrieved on May 6, 2004] Retrieved from the Aztec Sensible Cooling website using Internet URL: http://www.mestek.com/companies/Aztec.html.
(Continued)

*Primary Examiner* — William Doerrler
(74) *Attorney, Agent, or Firm* — Oliff PLC

(57) ABSTRACT

A heat exchanger including a header having a plurality of header openings with rigid tubes that may be made of plastic are inserted in the openings. The tubes are sealed to the header to prevent leakage between the header and the tubes to prevent water and air leakage between the wet, scavenger air stream flowing through the tubes and a dry air stream flowing around the tubes. A method of making the heat exchanger includes providing the openings with a flange and uses an interference fit between the rigid heat exchange tubes and the header openings. A self-leveling sealant may be used to seal the heat exchanger tubes to the header using, for example, a paint roller and/or a paint sprayer.

31 Claims, 8 Drawing Sheets

(51) Int. Cl.

| | |
|---|---|
| ***B23P 15/26*** | (2006.01) |
| ***F28F 9/04*** | (2006.01) |
| ***F28F 1/40*** | (2006.01) |
| ***F28F 9/14*** | (2006.01) |
| ***F28F 9/16*** | (2006.01) |
| ***F28F 21/06*** | (2006.01) |
| *F24F 1/00* | (2011.01) |

(52) U.S. Cl.
CPC .... *Y10T 29/49364* (2015.01); *Y10T 29/49373* (2015.01); *Y10T 29/49377* (2015.01); *Y10T 29/49378* (2015.01); *Y10T 29/49384* (2015.01)

(56) References Cited

U.S. PATENT DOCUMENTS

| | | | | | |
|---|---|---|---|---|---|
| 3,489,209 | A | | 1/1970 | Johnson | |
| 3,857,151 | A | * | 12/1974 | Young et al. | 29/890.047 |
| 3,993,126 | A | | 11/1976 | Taylor | |
| 4,190,101 | A | | 2/1980 | Hartmann | |
| 4,382,468 | A | * | 5/1983 | Hastwell | 165/173 |
| 4,497,363 | A | | 2/1985 | Heronemus | |
| 4,577,680 | A | | 3/1986 | Clem et al. | |
| 4,671,212 | A | * | 6/1987 | Smith | 122/18.2 |
| 4,735,261 | A | | 4/1988 | Huebner | |
| 4,842,049 | A | * | 6/1989 | Dodds | 165/46 |
| 5,146,977 | A | * | 9/1992 | Kiser | 165/229 |
| 5,150,520 | A | * | 9/1992 | DeRisi | 29/890.043 |
| 5,152,339 | A | | 10/1992 | Calleson | |
| 5,178,684 | A | | 1/1993 | Hutchins, Sr. | |
| 5,195,240 | A | * | 3/1993 | Shuster et al. | 29/890.039 |
| 5,211,221 | A | * | 5/1993 | Lease | 165/150 |
| 5,383,517 | A | | 1/1995 | Dierbeck | |
| 5,615,898 | A | * | 4/1997 | Clark et al. | 277/596 |

OTHER PUBLICATIONS

Indirect Evaporative Cooling, [online], [retrieved May 26, 2004] Retrieved using Internet URL: http://www.espnw.com/QDT/IDEC.html.

Indirect Evaporative Cooling, [online], [retrieved May 25, 2004] Retrieved using the Energy Labs Inc. website using Internet URL: http://www.energylabs.com/web/components.asp?OP=Indirect_Evaporative_Cooling.

Indirect/Direct Multiple Stages of Cooling, [online], [retrieved May 26, 2004] Retrieved using Internet URL: http://www.specair.net/stageii.html.

Sep. 30, 2014 Office Action issued in U.S. Appl. No. 13/901,757.

Oct. 6, 2014 Office Action issued in U.S. Appl. No. 13/901,769.

* cited by examiner

INDIRECT EVAPORATIVE COOLING HEAT EXCHANGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

[This is a Division of application Ser. No. 10/853,160 filed May 26, 2004. The entire disclosure of the prior application is hereby incorporated by reference herein in its entirety.] *More than one reissue application has been filed for the reissuance of U.S. Pat. No. 7,716,829. Reissue application Ser. No. 13/901,769, filed on May 24, 2013, is a reissue divisional of the present application. Reissue application Ser. No. 13/901,757, filed on May 24, 2013, is a reissue continuation of the present application. The present application (Ser. No. 13/506,713, filed on May 11, 2012) is an application for reissuance of U.S. Pat. No. 7,716,829, which is a continuation of application Ser. No. 10/853,160, now U.S. Pat. No. 7,128,138. The entire disclosure of application Ser. No. 10/853,160 is hereby incorporated by reference herein in its entirety.*

BACKGROUND OF THE INVENTION

1. Field of Invention

This invention relates to indirect evaporative cooling technology, and particularly to heat exchangers useful in indirect evaporative cooling devices used for conditioning air.

2. Description of Related Art

Evaporative cooling involves lowering the temperature of a liquid by utilizing the latent heat of vaporization of a portion of the liquid. The term "Indirect Evaporative Cooling" was coined by personnel at Des Champs Laboratories in 1974, when they decided to enhance summer-time air-to-air energy recovery, from building exhaust air, by utilizing the wet bulb temperature of the exhaust air instead of the higher dry bulb temperature. At the time, it was common practice during summer months to transfer energy from the cooler exhaust air to the warm, outdoor, make-up air by using an air-to-air heat exchanger. The driving force that causes the transfer of energy within the heat exchanger, in the aforementioned process, is the sensible temperature difference between the two air streams. During summer months, the outdoor air that is delivered to a space, and the recirculated internal air, are usually air-conditioned. As a result, the air within the space has a lower wet bulb temperature than the outdoor air or the inside dry bulb temperature.

By spraying water on the surface of the exhaust side of the air-to-air heat exchanger during the cooling season, the exhaust air flow, at a low wet bulb temperature, evaporates water from that exhaust side surface and thereby attempts to drive the water/exhaust-side surface temperature lower, approaching the exhaust air wet-bulb temperature at the limit. The supply air, flowing on the other side of the membrane that separates the two air streams, comes in contact with a surface (the opposite side of the membrane from the exhaust side) that is much cooler and consequently more energy is transferred between air streams and thus a greater energy saving occurs. The reason the surface is cooler than it would otherwise be is because of the evaporative cooling that takes place at the exhaust air/water layer interface, which in turn manifests itself as a cooler membrane temperature than would exist if the exhaust air were simply left dry with no water spray. As a matter of interest is the fact that the temperature drop across the membrane, from the exhaust-side surface to the supply-side surface, is very small, i.e., on the order of a fraction of a degree while the typical temperature difference between the two bulk air streams is on the order of 10 to 40 F.°.

Early indirect evaporative cooling (IEC) units were simply a modification of standard air-to-air heat exchangers that were used to extract energy (or lack of energy) from the exhaust air and transfer it to fresh, incoming make-up air, thus reducing the energy that would otherwise be required to condition the outdoor air prior to delivering it to the occupied space. Consequently, the heat transfer devices used in the early IEC units were designed to transfer energy in a dry environment. In contrast, more recent IEC units are subjected to a wet environment. Such wet environments are known to contain a wide range of contaminants and are often corrosive to IEC components. As a result of the hostile environment that such IEC heat exchangers witnessed, they were maintenance prone and short lived. Consequently, IECs, after getting off to an admirable start in the late 1970s and early 1980s, languished in the 1990s and, so far, into the new century even though IECs have the potential for tremendous energy savings and reduction in peak summer electrical demand.

Additionally, known heat exchangers have designs that require lengthy assembly periods. For example, in known systems, assembly of heat exchanger tubes to a plate or manifold requires an individual to seal around the perimeter of each tube by hand in an attempt to prevent leaks. This method of assembly often requires 10-20 hours to implement. Furthermore, extensive quality assurance is also necessary due to the possibility of leaks.

SUMMARY OF THE INVENTION

The present invention is directed to improvements in indirect evaporative cooling technology. Exemplary improvements include a novel heat exchanger useful in indirect evaporative cooling devices used for conditioning air. In one exemplary embodiment of the invention, an air-to-air heat exchanger designed specifically for use in hostile environments associated with the application of IECs in wet environments is provided.

Because the pH level of water varies from acidic to alkaline depending upon the geographic location of the unit, the present invention uses materials that function properly over the varying pH levels of water, such as, for example, plastic as a suitable material with which to construct the IEC heat exchanger. Additionally, because water can be very hard, i.e., have a high mineral concentration, IEC heat exchangers according to this invention are designed to be relatively unaffected by water hardness and the possible resulting material build-up within the heat exchanger.

Various embodiments of the systems and methods according to this invention provide IEC heat exchangers that are relatively economical to manufacture and relatively quick to assemble.

Various embodiments of the systems and methods according to this invention provide IEC heat exchangers that are relatively no more maintenance prone than a common air-conditioner.

Various embodiments of the systems and methods according to the invention separately provide IEC heat exchangers that, serves simultaneously as integral cooling towers and air-to-air heat exchangers.

Various embodiments of the systems and methods of manufacture according to the invention separately provide means of containing cooling water in areas that the water is intended to be so as to perform the necessary thermodynamic functions of an IEC heat exchanger.

Various embodiments of the systems and methods according to the invention separately provide IEC heat exchangers which tend not to degrade because of high or low pH water in contact with a surface of the heat exchanger.

Various embodiments of the systems and methods according to the invention separately provide IEC heat exchangers that have a wet side surface that is wettable, can be kept free of mineral deposits even though hard water intermittently sprayed on a surface of the heat exchanger, and can be manufactured at a cost that allows an ICE containing the heat exchanger to compete ton for ton of air conditioning with standard mechanical air conditioning.

Various embodiments of the systems and methods according to the invention separately provide IEC heat exchangers that have a unique heat exchange tube design.

Various embodiments of the systems and methods according to the invention separately provide IEC heat exchanges having a unique connection and/or seal between heat exchange tubes and a header.

Various embodiments of the systems and methods according to the invention provide IEC heat exchange methods of manufacture that achieve relatively low cost assembly of heat exchanger components and easy repeatability of manufacture of such components by relatively unskilled labor.

Various embodiments of the systems and methods according to the invention provide IEC heat exchange methods of manufacture including angling the exchange tubes at a bottom end so that the tubes enter a cut out portion of a header plate of the heat exchanger with ease.

Various embodiments of the systems and methods according to the invention provide IEC heat exchangers having an improved interface between a heat exchange tube and a header.

DETAILED DESCRIPTION OF PREFERRED EMBODIMENTS

Figure 1:
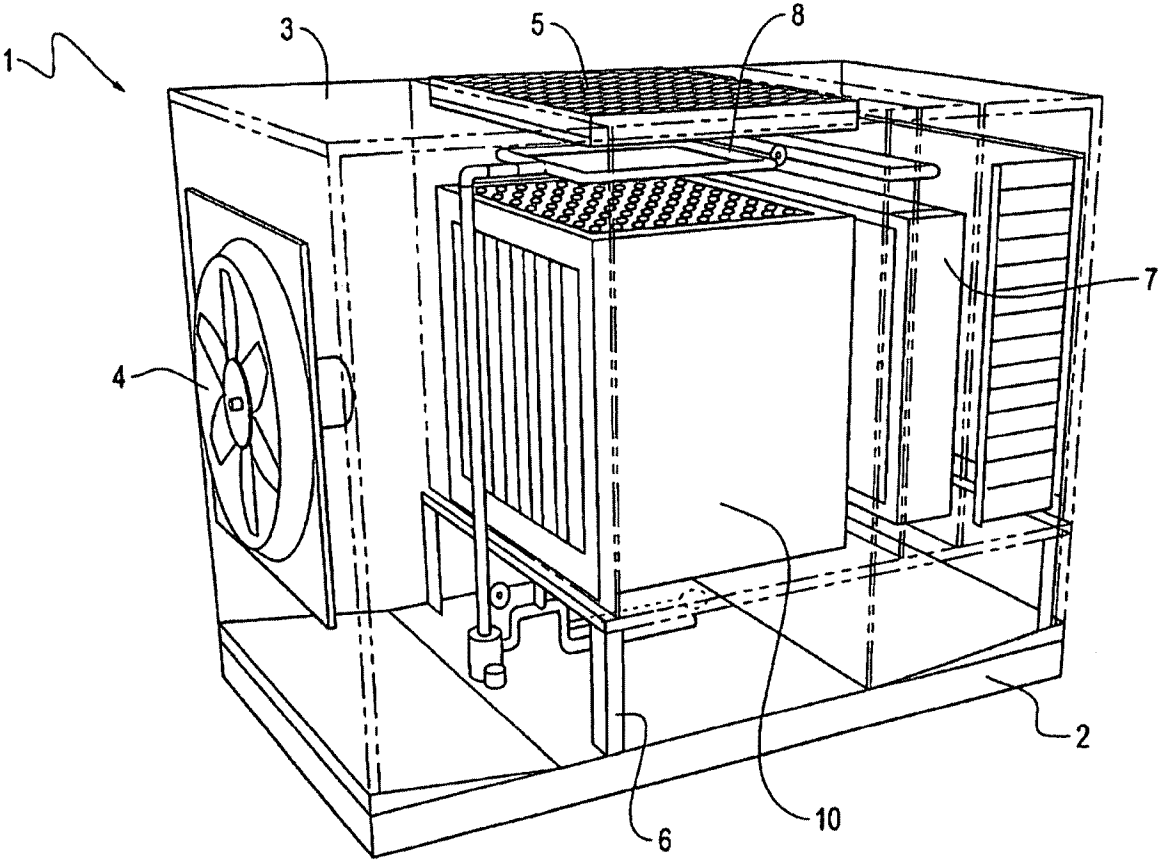
FIG. 1 shows a perspective view of an indirect/direct evaporative cooling unit, including an indirect evaporative cooler heat exchanger, according to an exemplary embodiment of the invention.

FIG. 1 is a perspective view of an indirect/direct evaporative cooling unit, including an indirect evaporative cooler heat exchanger, according to an exemplary embodiment of the invention. As shown in FIG. 1, an indirect/direct evaporative cooling unit 1 includes, a base portion 2, a frame 3, and an air intake fan 4 mounted in a wall of the frame 3 at one end of the unit 1. The intake fan 4 provides outside air to the unit 1. The unit 1 further includes an exhaust grate 5 mounted in the top of the unit 1 to allow high energy, unconditioned air to exit the unit 1.

A support frame 6 is mounted to the base portion 2 within the unit 1 to provide a mounting point for the indirect heat exchanger 10 and the direct cooling stage 7. A water distribution manifold 8 is disposed over the indirect heat exchanger 10 and the direct cooling stage 7 to deliver water thereto. In other words, the unit shown in FIG. 1 includes all the devices that are necessary for proper operation to cool an air stream, as well as the novel indirect heat exchanger 10 according to the invention.

Figure 2:
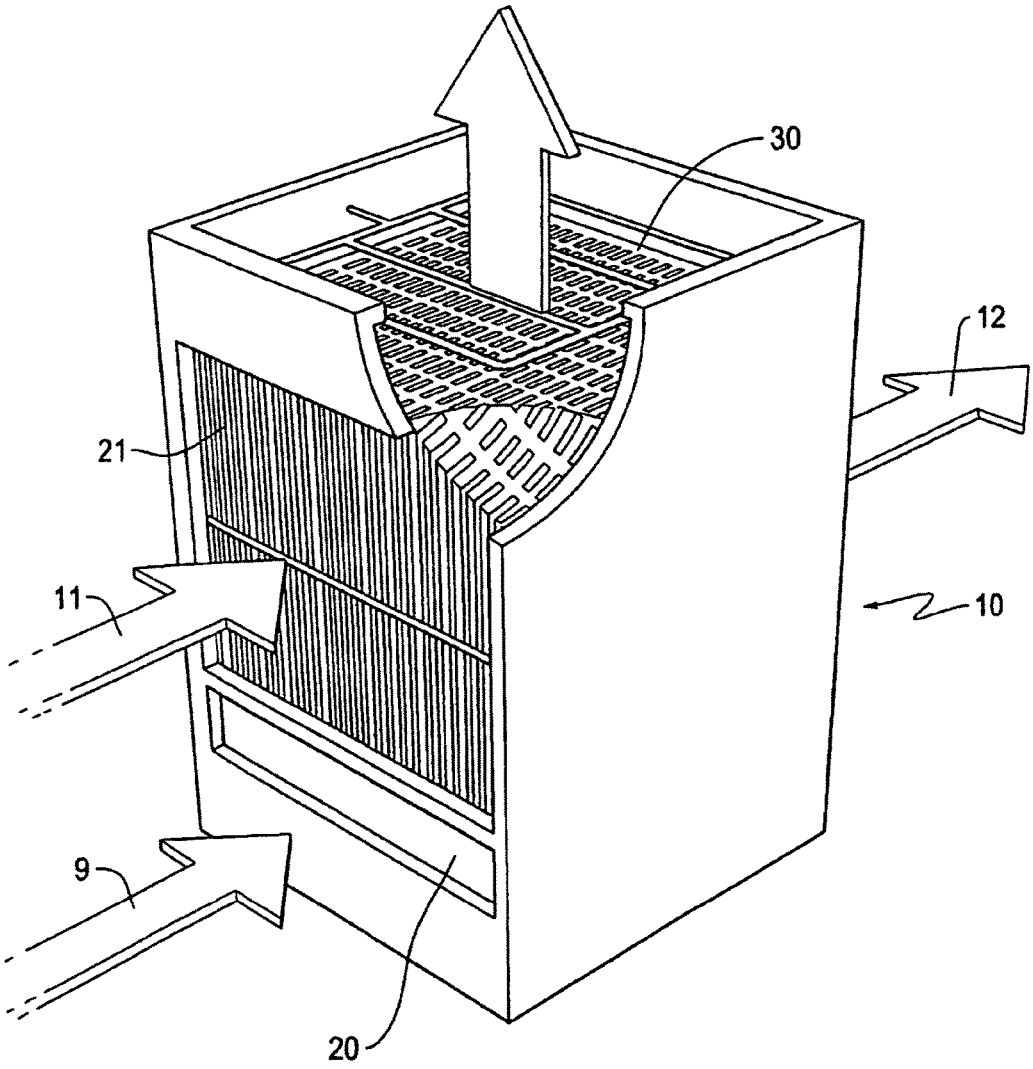
FIG. 2 shows a perspective view of an indirect evaporative cooler, including airflow through the heat exchanger, according to an exemplary embodiment of the invention.
Figure 5:
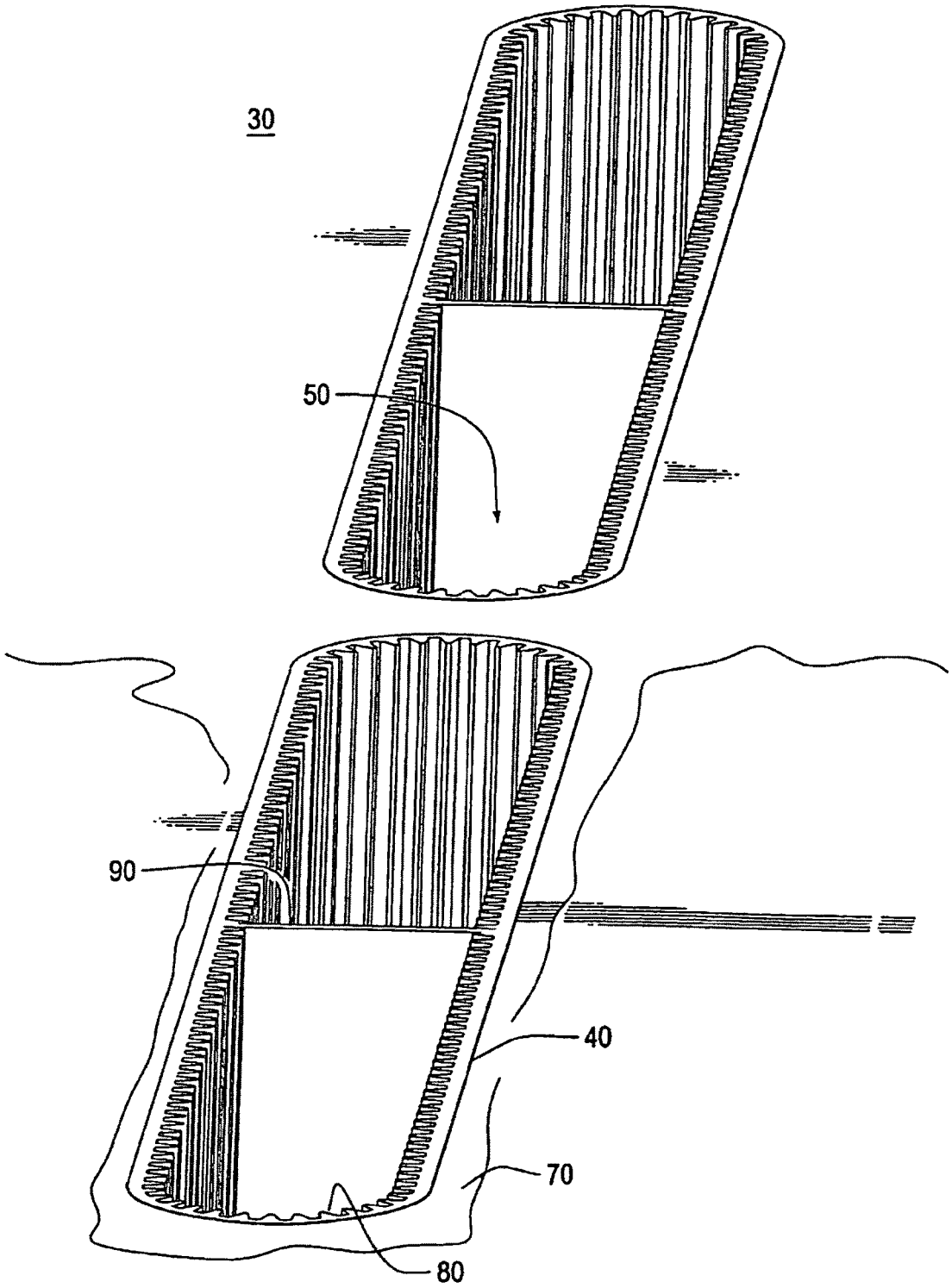
FIG. 5 shows a partial view of the header plate with plastic tubes installed in header plate openings, according to an exemplary embodiment of the invention.

FIG. 2 shows a perspective view of an indirect evaporative cooler, according an exemplary embodiment of the invention. As shown in FIG. 2, outside air drawn into the unit 1 by the intake fan 4 flows into air intake portions 20, 21. A first outside air stream 9 enters the heat exchanger 10 through a first air intake portion 20 and flows through heat exchanger tubes 40 (FIG. 5). The first outside air stream 9 proceeds through the first air intake portion 20 and enters into the tubes 40 through an open bottom portion of the tubes 40 (not shown). The first outside air stream 9 flows upwardly through the tubes 40 toward the header plate 30.

Figure 3:
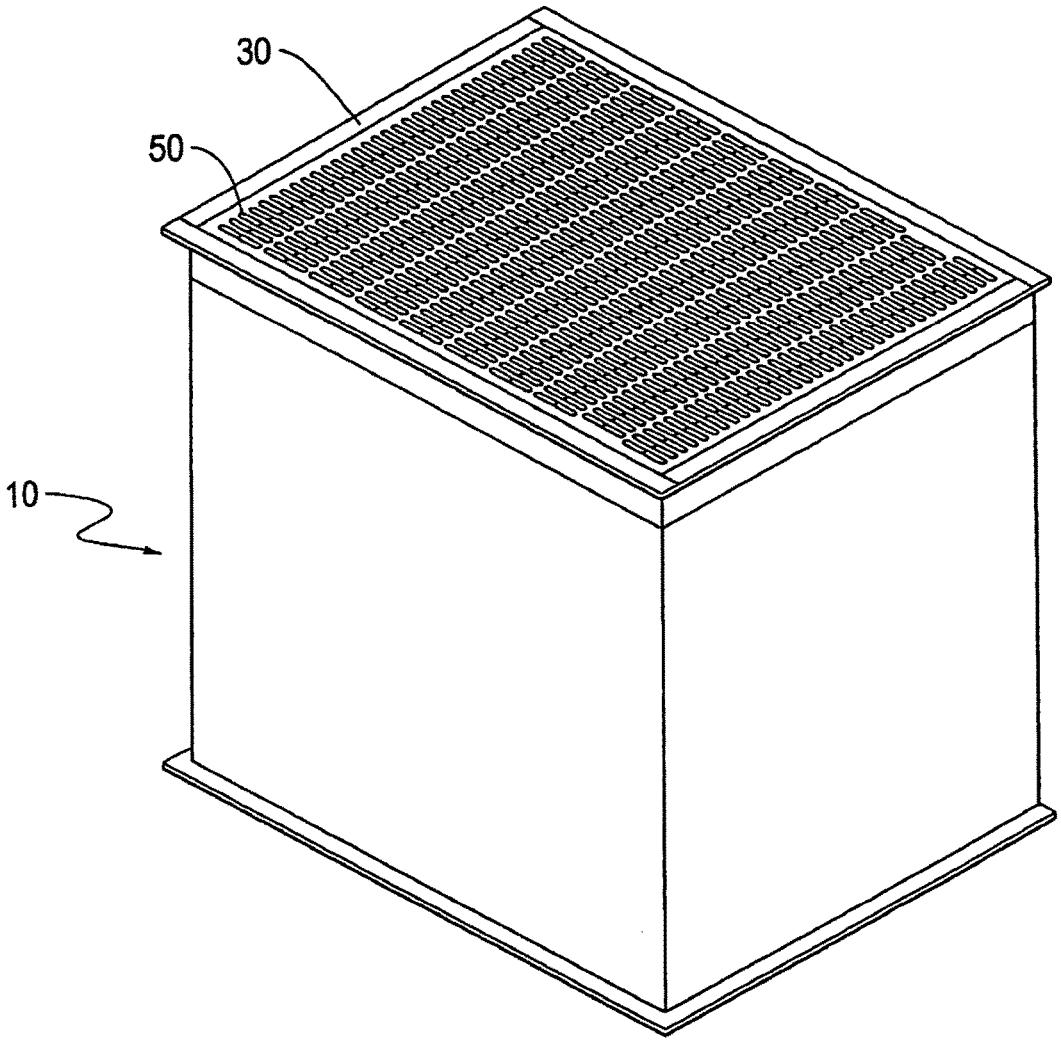
FIG. 3 shows a top view of a sealed header plate of a heat exchanger, according to an exemplary embodiment of the invention.
Figure 4:
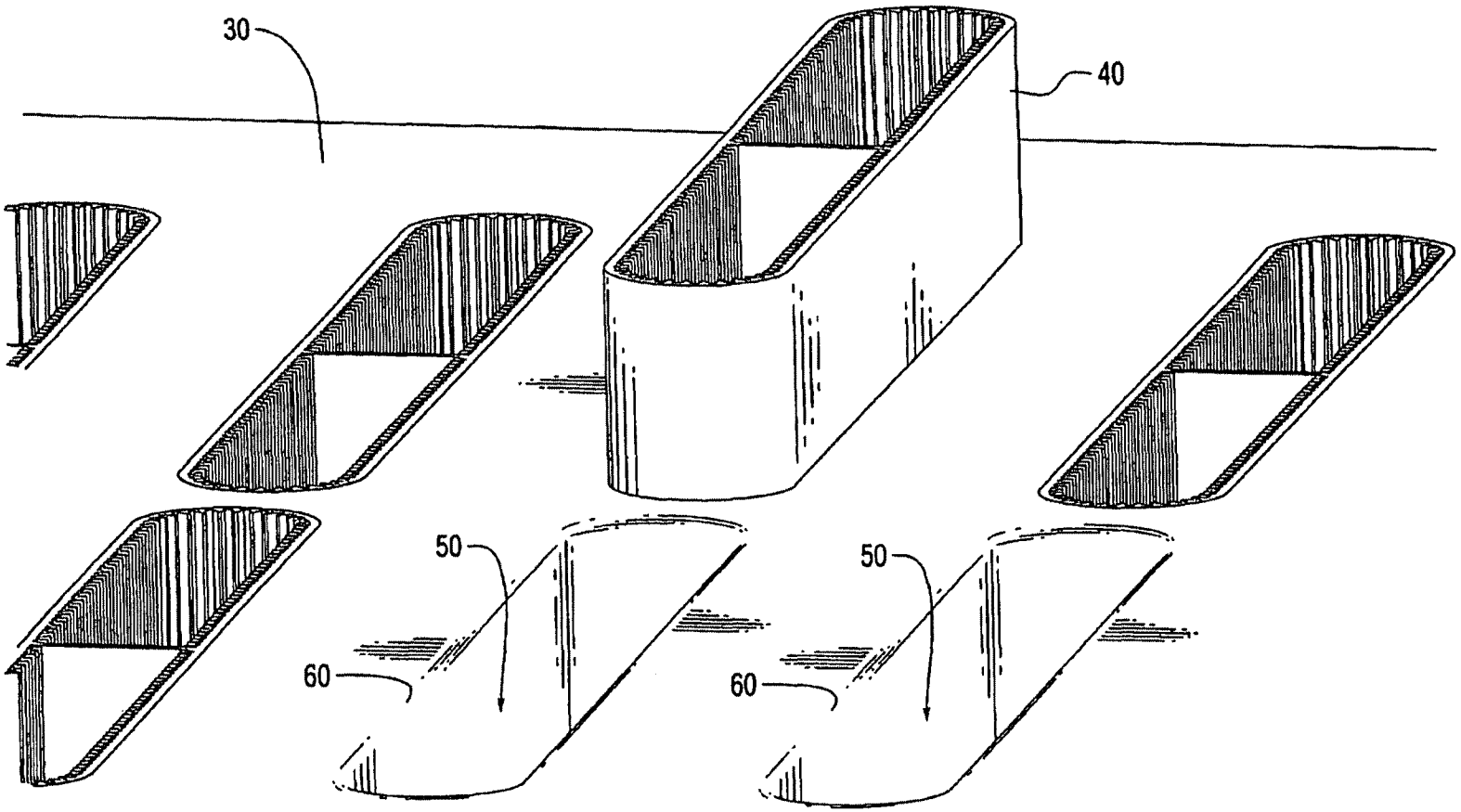
FIG. 4 shows a partial view of openings in the header plate and a plastic tube partially inserted in an opening of the header plate, according to an exemplary embodiment of the invention.

Water from the water distribution manifold 8 is sprayed onto the header plate 30 and into header plate openings 50 (FIGS. 3 and 4). As the water flows downwardly through the tubes 40, the first outside air stream 9 flows upwardly through the tubes 40. Thus, the first outside air stream 9 serves as air that evaporatively cools the tube 40 from within the tube 40. The first outside air stream 9 exits the heat exchanger 10 through the header plate 30 as moistened exhaust air. The exhaust air exits the unit 1 through the exhaust grate 5.

A second outside air stream 11 enters the heat exchanger 10 through a second outside air intake portion 21 and flows around the outside of the tubes 40 disposed within the heat exchanger 10. The second outside air stream 11 does not come into direct contact with water within the tubes 40. Therefore, the second outside air stream 11 is cooled without having water added. The second outside air stream 11 exits the exchanger 10 as dry conditioned air 12.

In operation, the dry conditioned air 12 then may flow into a direct cooling stage 7 (FIG. 1) comprised of a suitable high quality evaporative medium, such as "CELDEC", available from Munters Corporation.

FIG. 3 shows a top view of a sealed header plate, according to an exemplary embodiment of the invention. As shown in FIG. 3, the heat exchanger 10 includes a header plate 30 having a plurality of header plate openings 50. In an exemplary embodiment of the invention, the header plate 30 is comprised of a metal, such as aluminum, or other suitable material. In a header plate 30 made of aluminum, the header plate 30 is typically made from an ⅛-inch thick aluminum sheet. Because aluminum is sometime corrosive to the water used in IECs, the surface of the header 30 that is exposed to water is coated at the time the tubes 40 are sealed into the header 30.

FIG. 4 shows a partial view of header plate openings and a plastic tube partially inserted in an opening. As shown in the exemplary embodiment of FIG. 4, the header plate 30 includes a plurality of openings 50. The openings 50 in the header plate 30 include an edge that is rolled inwardly to form a flange 60. The flange 60 provides an interface between the header plate 30 and the tubes 40 inserted in the openings 50.

In the exemplary embodiment of the invention, the flange 60 also aids in the insertion of the tube 40 into the openings 50. The flange 60 also serves to provide greater contact surface area between the header plate 30 and the tube 40 when the tube is installed in the header plate 30. Additionally, by providing a header plate 30 with openings 50 having such a flange 60, a more rigid header plate construction is achieved.

In an exemplary embodiment of the invention, the flange 60 serves to allow for an approximately flush fit between the top of the tubes 40 when the tubes 40 are installed in the header plate 30. By providing such a fit between the tubes 40 and the header plate 30 a more equal flow of cooling water delivered onto the header plate 30 from the water distribution manifold 8 and into each of the tubes 40 is achieved. Such a flow of water increases the efficiency of the heat exchanger 10 which further optimizes the cooling capability of the unit 1. Additionally, such a configuration enables a sealant 70 (FIGS. 5 and 6) to be easily applied to the surface of the header 30 after the tubes 40 are installed.

As shown in FIG. 4, the tubes 40 are inserted into the openings 50 in the header plate 30. In an exemplary embodiment of the invention, the tubes 40 may be made of a plastic and formed by known extrusion processes. Such plastics include, for example, corrosion resistant polymers having a fire and smoke retardant rating that meets or exceeds UL94 V-O or V-l rating.

FIG. 5 shows a partial view of the header plate with plastic tubes 40 installed in the openings and treated with a sealant. As shown in FIG. 5, the tubes 40 are installed in the openings 50 of the header plate 30. The tubes 40 may be installed by press-fitting, or any other suitable method. Upon installation of the tubes 40 in the header plate 30, a sealant 70 is applied over the exposed surface of the header plate 30 and the tubes 40. In an exemplary embodiment of the invention, the sealant 70 may be a liquid adhesive, such as liquid Vulkem®, which is a self-leveling sealant, or other suitable adhesive.

Sealing the surface of the header 30 serves to prevent water and air leakage between the wet, scavenger first air stream 9 flowing through the tubes 40 and also serves to hold the tubes 40 flush with the top surface of the header 30. In an exemplary embodiment of the invention, the tubes 40 are kept flush with the surface of the header 30 to allow the water sprayed from the water distribution manifold 8 to flow into the tubes 40 without obstruction.

Because the tubes 40 are held approximately flush with the top surface of the header 30, the sealant 70 may be applied by rolling the sealant 70 onto the surface of the header plate 30, such as with a common paint roller. By applying the sealant 70 using such a method, the time needed to seal the tubes 40 to the header 30 is significantly reduced. For example, applying the sealant 70 with a roller may take approximately 5-10 minutes, or less, depending on the size of the header plate 30. In contrast, known designs of heat exchangers require approximately 10-20 hours to seal heat exchanger tubes to a plate or manifold.

In another example, using a self-leveling single component liquid urethane applied with a six inch wide roller to seal around each tube of a header plate having approximately 44 tubes requires about thirty seconds. In contrast, applying a known "gun grade" sealant from a caulking gun to seal around each tube of a header plate having approximately 44 tubes requires approximately four minutes. The time differential between the two techniques increases as the size of the header plate and the number of tubes increases.

Although these examples describe applying the sealant with a roller, other methods of applying the sealant are within the scope of this invention. For example, the sealant 70 may be sprayed on to the surface of the header plate 30 and the tubes 40, thereby significantly reducing the time required to seal heat exchangers over known methods.

Figure 6:
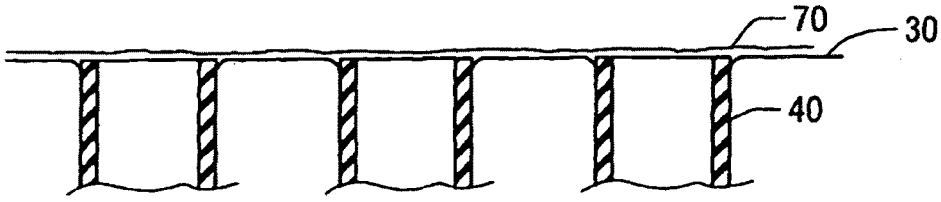
FIG. 6 shows a cross-section of a sealed header plate and plastic tube, according to an exemplary embodiment of the invention.

FIG. 6 shows a cross-section of a sealed header plate and plastic tube, according to an exemplary embodiment of the invention. In FIG. 6, a sealant 70, such as a water resistant paint, is applied to the surface of the header plate 30 and the tubes 40. The sealant 70 may be applied with a roller, sprayer, or other technique. When the sealant 70 is applied, for example applying a water resistant paint with a roller, the sealant 70 will fill gaps which may be present between the tubes 40 and the header plate 30.

Figure 7:
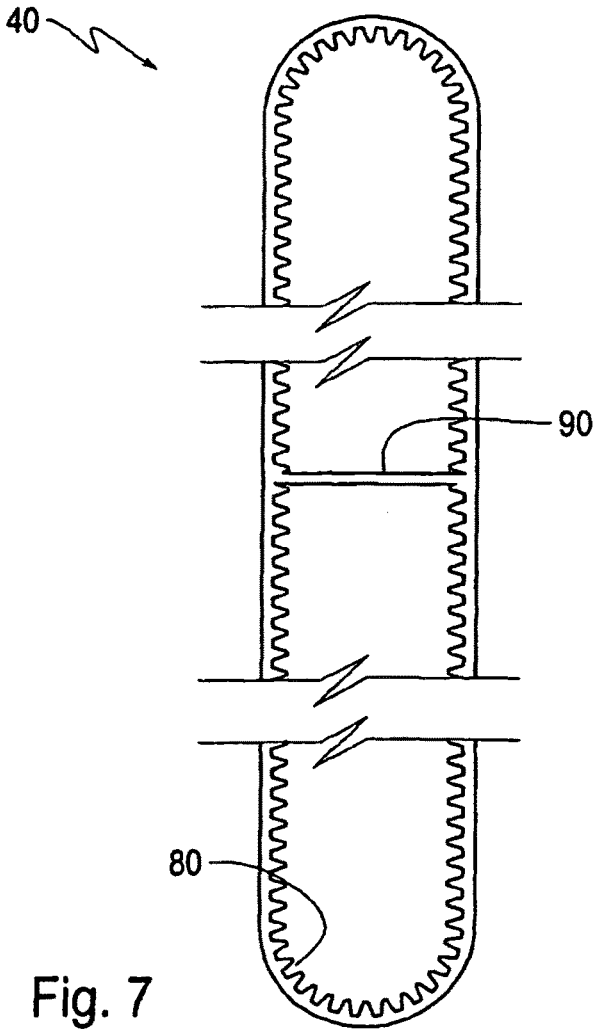
FIG. 7 is a schematic view of a cross-section of a plastic tube, according to an exemplary embodiment of the invention.

FIG. 7 is a schematic view of a cross-section of a plastic tube, according to an exemplary embodiment of the invention. In an exemplary embodiment of the invention, the tubes 40 are essentially ovoid in shape and may have an external chord length of about 3 inches and an external width of about 0.375 inches. The tubes 40 may also have a wall thickness of about 0.020 inches. A web 90 may be formed at the center of the chord length. The web 90 is formed transverse to the narrow, elongated portions of the tube 40 and connects the sides of the tube 40 at the center of the cord length. In the exemplary embodiment, the tubes 40 may range in length from about 24 to about 96 inches, with the most common length being about 48 inches in length. In such an exemplary embodiment, the exchanger would have approximately 144-1000 tubes disposed therein. Although this exemplary embodiment includes the description discussed above, tubes 40 having other dimensions are contemplated.

In an exemplary embodiment of the invention, the web 90 aids in maintaining the dimensions of the tube 40 during handling and assembly of the heat exchanger 10. For example, the web 90 aids in maintaining the dimension of the width of the tube 40 as the tube 40 is inserted into the header 30. If the web 90 were not in place, the tube 40 would tend to draw up on its center and result in a tube width of less than the desired 0.375 inches of the exemplary embodiment, thus causing problems with sealing the tube 40 to the header 30. The result of not completely sealing the tube 40 to the header 30 is unwanted air and water leakage between the dry supply second air stream 11 and the wetted, humid exhaust/scavenger first air stream 9.

In an exemplary embodiment of the invention, the tubes 40 may include a plurality of grooves 80 formed on an inner wall surface of the tubes 40. The grooves 80 aid in wetting the inner surface of the tubes 40 by causing the water from the water distribution manifold 8, through the header openings 50, to fully wet the inner surface by capillary action. The grooves 80 also provide a greater surface area from which water may evaporate to aid in increasing cooling efficiency. Additionally, because the grooves 80 are formed in the inner wall surface of the tubes 40, a thinner net wall thickness is achieved through which energy that is to be transferred encounters less thermal resistance to energy flow. The grooves 80 also allow the tubes 40 to have a greater structural rigidity, thereby preventing ballooning or collapsing of the tubes 40 as a result of fan pressure when the air intake fan 4 provides air flow through the exchanger 10.

In an exemplary embodiment of the invention, the walls of the tube 40 are designed with a strength that allows for a determined amount of transverse wall movement, or flex. For example, a determined amount of transverse wall movement, i.e., on the order of 0.025 inches, occurs in the tube wall when the pressure in the tube 40 is raised to 0.5-inches of water column pressure. As a result of such determined transverse movement, any solid deposits, such as mineral deposits or contaminant build-up on the inner surface of the wall, are separated from the wall surface when the pressure changes sufficiently to cause wall flex. For example, a sufficient pressure change may result when the fan 4 that blows air through the heat exchanger 10 is turned on or off. The deposits drop into a water sump (not shown) disposed at the base 2 of the unit 1 and are flushed from the system on a regular basis.

Figure 8:
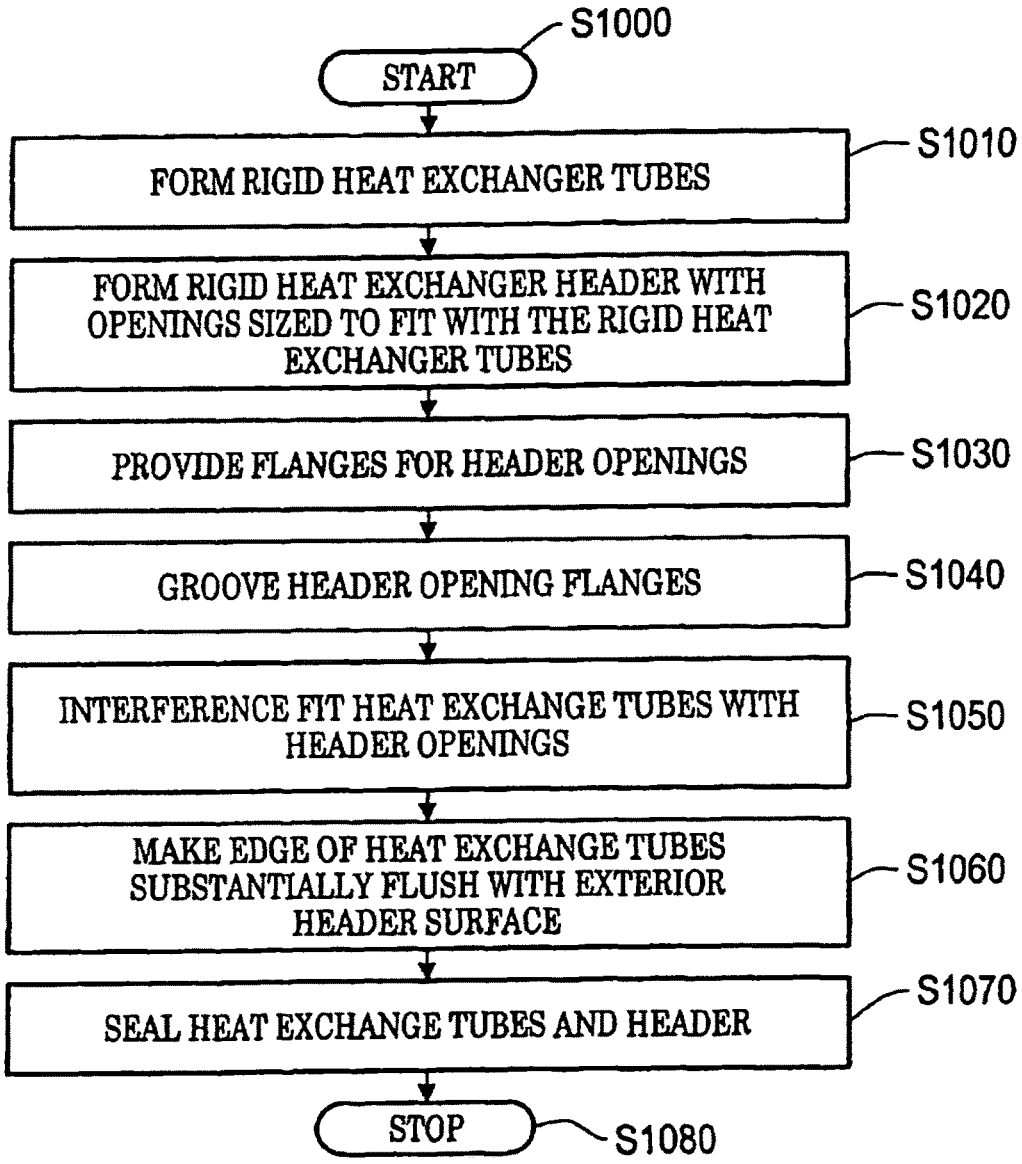
FIG. 8 is a flow chart showing an exemplary method of assembly of an IEC heat exchanger, according to an exemplary embodiment of the invention.

FIG. 8 is a flow chart showing an exemplary method of assembly of an IEC heat exchanger according to the invention. The method of manufacturing a heat exchanger begins in step S1000 and proceeds to step S1010 where rigid heat exchanger tubes made, for example, of a suitable plastic material, are formed. As noted above, in one exemplary embodiment, the tubes have an ovoid shape. Then, in step S1020, a rigid heat exchanger header is formed which has a relatively flat surface containing openings. Next, in step S1030, each opening is provided with a flange to accommodate a rigid heat exchange tube snugly. Next, in step S1040, one or more grooves are provided in the flange. Then, in step S1050, an heat exchange tube is interference fit into each header opening. Next, in step S1060, the edge of each heat exchange tube is made flush with the exterior surface of the heat exchange header. Then, a sealant is applied to the header with inserted heat exchange tubes. Then, the process ends in step S1080. As noted above, a sealant may be applied using a paint roller and/or a paint sprayer, to reduce the manufacturing time of the IEC heat exchanger.

Figure 9A:
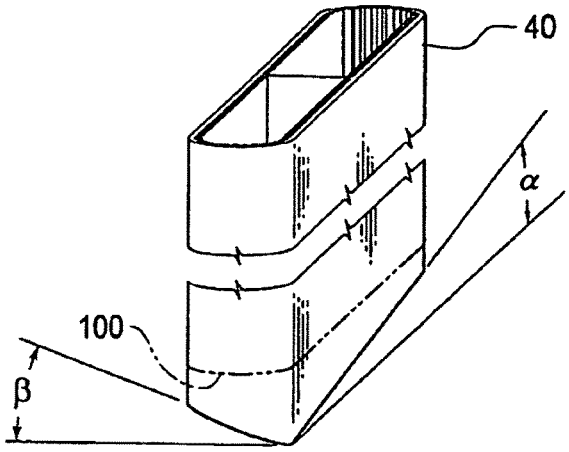
FIGS. 9A-9C show an exemplary embodiment of a tube having an angled bottom portion, according to an exemplary embodiment of the invention.
Figure 9B:
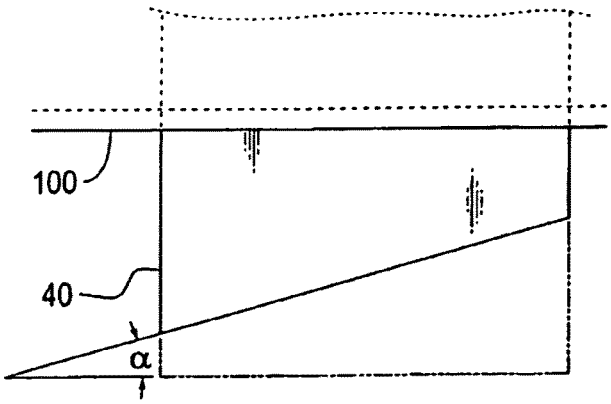
Figure 9C:
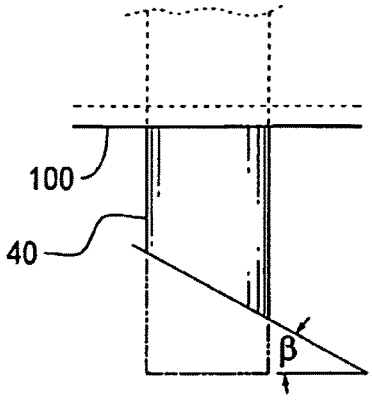

FIGS. 9A-9C show an exemplary embodiment of a tube having an angled bottom portion. In an exemplary embodiment of the invention, the tubes 40 are angled at a bottom end portion so that the tubes 40 may be more easily inserted into the openings 50 of a lower header plate 100 and intermediate spacer plates (not shown). The tubes 40 may be angled both longitudinally and transversely at a cut on the bottom end portion of the tubes 40. By having a compound angle cut on a bottom end of the tubes 40, the tubes 40 may be more easily aligned with openings in the lower header 100 having an opening in its surface that has a perimeter shape of the same dimension as the tubes 40. The compound angle cut allows the tubes 40 to be guided to the openings in the lower header 100 and then press-fit into the lower header 100. The tubes 40 may be cut during or after manufacture of the tubes. In an exemplary embodiment, the tube 40 has an angle that is approximately 20-30 degrees from the horizontal. Tubes having cuts forming other angle measurements are also contemplated by this invention.

While the invention has been described in conjunction with exemplary embodiments, these embodiments should be viewed as illustrative, not limiting. Various modifications, substitutes, or the like are possible within the spirit and scope of the invention. For example, the invention may be used with or without direct evaporative coolers.

What is claimed is:

1. A method of sealing a plurality of rigid tubes to a metal header having a plurality of openings therethrough, comprising:

forming a flange into each of the openings in the header;

inserting the rigid tubes into the openings in the header, the header having an exterior surface and an interior surface and the rigid tubes having a top portion and a bottom portion, the rigid tubes are inserted with the bottom portion first, and are placed into the openings of the header so that the top portion of the rigid tubes are substantially flush with the exterior surface of the header; and applying a sealant to the exterior surface of the header and the inserted rigid tubes by an absorbent applicator and/or a spray applicator.

2. The method of claim 1, wherein applying the sealant includes rolling an adhesive over the header.

3. The method of claim 1, wherein at least one groove is provided in the tubes.

4. The method of claim 1, wherein an end surface of the rigid tubes is angled with respect to a bottom end portion of the rigid tubes.

5. The method of claim 1, wherein an end surface of the rigid tubes has a compound angle with respect to a bottom end portion of the rigid tubes.

6. The method of claim 4, wherein the end surface of the rigid tubes is angled at approximately 20 to 30 degrees from the horizontal.

7. The method of claim 1, wherein the sealant is a self-leveling adhesive.

8. The method of claim 1, wherein the flange extends in a direction perpendicular from the exterior surface of the header.

9. The method of claim 1, further comprising providing each of the openings with a flange before inserting the rigid tubes, wherein the flange extends in a direction perpendicular from the substantially uniform exterior surface of the header.

10. The method of claim 1, further comprising providing each of the openings with a flange before inserting the rigid tubes, wherein the flange extends in a direction perpendicular from the substantially planar exterior surface of the header.

*11. A method of operating a heat exchanger, comprising:*

*evaporatively cooling a plurality of rigid tubes by contacting the rigid tubes with water and a first air stream to cause water evaporation;*

*cooling air by contacting a second air stream with the evaporatively cooled rigid tubes to cool the air of the second air stream; and*

*causing the rigid tubes to expand and contract within a predetermined range to separate solid deposits accumulating on the rigid tubes as a result of water evaporation by changing a pressure of the rigid tubes by varying a speed of air contacting the rigid tubes,*

*wherein ends of the rigid tubes are sealed in a leak tight manner to openings formed within a header of the heat exchanger.*

*12. The method of claim 11, further comprising:*

*collecting solid deposits separated from the plurality of rigid tubes in a sump; and*

*flushing the solid deposits from the sump.*

*13. The method of claim 11, wherein the plurality of rigid tubes are formed from a plastic material.*

*14. The method of claim 13, wherein the plastic material comprises polyvinylchloride.*

*15. The method of claim 11, wherein the plurality of rigid tubes comprise corrosion resistant polymers having a fire and smoke retardant rating that meets or exceeds UL94 V-O or V-l rating.*

*16. The method of claim 11, wherein the expansion and contraction of the plurality of rigid tubes within the predetermined range is caused by changes in an internal pressure of the plurality of rigid tubes.*

*17. The method of claim 16, wherein the changes in the internal pressure of the plurality of rigid tubes are caused by varying a speed of the air flowing through an interior of the plurality of rigid tubes.*

*18. The method of claim 16, wherein the changes in the internal pressure of the plurality of rigid tubes are in a range of up to 0.5 inches of water column pressure.*

*19. The method of claim 11, wherein the predetermined range is up to 0.025 inches.*

*20. The method of claim 11, wherein the plurality of rigid tubes have a wall thickness of about 0.020 inches.*

*21. The method of claim 11, wherein the plurality of rigid tubes have an internal web structure to flexibly maintain tube dimensions, and to maintain the expansion and contraction of the plurality of rigid tubes within the predetermined range.*

*22. The method of claim 11, wherein the plurality of rigid tubes are sealed to the header by an adhesive.*

*23. The method of claim 11, wherein the plurality of rigid tubes are sealed to the header by a self-leveling liquid.*

*24. The method of claim 11, wherein the plurality of rigid tubes include grooves formed on the internal surface to provide increased surface area and reduce thermal resistance.*

*25. The method of claim 11, wherein individual tubes of the plurality of rigid tubes have openings at both ends.*

*26. The method of claim 11, wherein the water and first air stream flow in opposite directions.*

*27. The method of claim 11, wherein the plurality of rigid tubes are non-cylindrical tubes.*

*28. The method of claim 27, wherein the non-cylindrical tubes are ovoid tubes.*

*29. The method of claim 11, wherein the method is performed within an evaporative cooling unit including the heat exchanger, and the evaporative cooling unit provides water and air to the heat exchanger.*

*30. The method of claim 29, wherein the evaporative cooling unit is an indirect evaporative cooling unit.*

*31. The method of claim 29, wherein the evaporative cooling unit is an indirect/direct evaporative cooling unit that comprises a direct cooling stage.*

* * * * *